United States Patent
Mouradian et al.

(10) Patent No.: US 12,425,298 B2
(45) Date of Patent: Sep. 23, 2025

(54) MODELLING AND OPTIMIZATION OF QUALITY OF EXPERIENCE

(71) Applicant: Telefonaktiebolaget LM Ericsson (publ), Stockholm (SE)

(72) Inventors: Carla Mouradian, Montreal (CA); Mbarka Soualhia, Laval (CA); Dániel Géhberger, Montreal (CA); Wubin Li, Kirkland (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 9 days.

(21) Appl. No.: 18/693,809

(22) PCT Filed: Sep. 28, 2021

(86) PCT No.: PCT/IB2021/058866
§ 371 (c)(1),
(2) Date: Mar. 20, 2024

(87) PCT Pub. No.: WO2023/052810
PCT Pub. Date: Apr. 6, 2023

(65) Prior Publication Data
US 2024/0333587 A1  Oct. 3, 2024

(51) Int. Cl.
*H04L 41/0816* (2022.01)
*H04L 41/0823* (2022.01)
*H04L 41/5067* (2022.01)

(52) U.S. Cl.
CPC ...... *H04L 41/0816* (2013.01); *H04L 41/0823* (2013.01); *H04L 41/5067* (2013.01)

(58) Field of Classification Search
CPC ............. H04L 41/0816; H04L 41/0823; H04L 41/5067; H04L 41/0631; H04L 41/16;
(Continued)

(56) References Cited

U.S. PATENT DOCUMENTS 8,280,994 B2   10/2012   Blouin et al.
9,900,256 B2   2/2018    Liao et al.
(Continued)

FOREIGN PATENT DOCUMENTS

WO   WO-2014134795 A1 *  9/2014   ............. A63F 13/10

OTHER PUBLICATIONS

International Search Report and Written Opinion mailed Jun. 20, 2022 in corresponding International Application No. PCT/IB2021/058866 (11 pages).
(Continued)

*Primary Examiner* — Philip C Lee
(74) *Attorney, Agent, or Firm* — Weisberg I.P. Law, P.A.

(57) ABSTRACT

A method for improving user experience associated with an application supported by a system is provided. The method comprises obtaining input data associated with a group of one or more features and determining a performance score associated with the obtained input data using a performance score generating model. The performance score indicates an estimated quality of user experience (QoE) of the application. The method further comprises determining whether to apply a configuration change based on the determined performance score. The configuration change is associated with the application and/or the system.

15 Claims, 9 Drawing Sheets

(58) Field of Classification Search
CPC .......... H04L 43/0823; H04L 43/0852; H04L
43/0876; H04L 43/16; H04L 41/145
See application file for complete search history.

(56) References Cited

U.S. PATENT DOCUMENTS

| | | | |
|---|---|---|---|
| 2011/0009193 | A1 | 1/2011 | Bond et al. |
| 2016/0271497 | A1 | 9/2016 | Li et al. |
| 2016/0315842 | A1* | 10/2016 | Boss .................. H04L 65/80 |
| 2017/0244777 | A1 | 8/2017 | Ouyang et al. |
| 2019/0239101 | A1 | 8/2019 | Ouyang et al. |
| 2020/0336396 | A1 | 10/2020 | Su et al. |

OTHER PUBLICATIONS

Batteram, et al., "Delivering Quality of Experience in Multimedia Networks," in Bell Labs Technical Journal, vol. 15, No. 1, pp. 175-193, Jun. 1, 2010 (19 pages).

Cegar et al., "Modelling effects of S3D visual discomfort in human emotional state using data mining techniques", Multimedia Tools and Applications, Mar. 30, 2020, vol. 79, No. 27-28, p. 19803-19829 (27 pages).

Brunnstrom, et al., "Qualinet White Paper on Definitions of Quality of Experience", Output from the fifth Qualinet meeting, Version 1.2 Novi Sad, Mar. 12, 2013 (25 pages).

Hoßfeld, et al., "Challenges of QoE Management for Cloud Applications", IEEE Communications Magazine, Apr. 2012 (9 pages).

Reiter, et al, "Factors Influencing Quality of Experience" Chapter 4 in Quality of Experience: Advanced Concepts, Applications and Methods, T-Labs Series in Telecommunication Services, Springer International Publishing, 2014, pp. 55-72. (21 pages).

Gupta, et al., "Using affective brain-computer interfaces to characterize human influential factors for speech quality-of-experience perception modelling", Human-centric Computing and Information Sciences. vol. 6, No. 1, pp. 1-19, 2016 (19 pages).

Hsu, et al., "QoS/QoE Mapping and Adjustment Model in the Cloud-based Multimedia Infrastructure", IEEE Systems Journal, vol. 8, No. 1, Mar. 2014 (9 pages).

* cited by examiner

MODELLING AND OPTIMIZATION OF QUALITY OF EXPERIENCE

CROSS REFERENCE TO RELATED APPLICATIONS

This application is a 35 U.S.C. § 371 National Stage of International Patent Application No. PCT/IB2021/058866, filed 2021 Sep. 28, which is incorporated by reference.

TECHNICAL FIELD

Disclosed are embodiments related to methods and systems for modelling and optimization of Quality of Experience (QoE).

BACKGROUND

It is predicted that the era of the Internet of Senses (IoS) will come by 2030. The IoS will enable having our different senses along with our brain more connected to the internet and will enable a vast amount of new use-cases.

Users' QoE has always been the key differentiator between providers (including application providers, infrastructure providers, etc.) and it can be expected that the IoS will magnify the importance of QoE. A common definition of QoE is as follows: "QoE is the degree of delight or annoyance of the user of an application or service. It results from the fulfillment of his or her expectations with respect to the utility and/or enjoyment of the application or service in the light of the user's personality and current state." Kjell Brunnström, Sergio Ariel Beker, Katrien de Moor, Ann Dooms, Sebastian Egger, et al. Qualinet White Paper on Definitions of Quality of Experience. 2013.

QoE has grown to a multi-disciplinary research field evaluating the relationship between a wide range of human and system-related factors. Understanding QoE is critical for any organization with an interest in providing the best experience to their customers/users.

In the context of cloud computing environment, there is intensive cost-driven competition among providers. In such environments, however, providers need to consider another differentiator than just the price—the quality of their services experienced by the users of their services. If the performance levels of the services do not reach expectations, users will reject the service or refuse adoption. On the other hand, meeting or exceeding expectations enhances a cloud provider's reputation and increases levels of utilization and adoption. Consequently, understanding and managing users' QoE for cloud services requires a multi-disciplinary view that integrates human factors, system/network factors, and business factors. Some of these (such as system/network factors) are straightforward and easy to describe while others (such as the human factors) are more difficult to describe.

Methods for evaluating the human factors of QoE have grown increasingly. Traditionally, it is assessed using subjective assessments. In this type of assessment, a human observer is asked to give a judgment on the perceived quality of the application used by the user. These assessments involve typically user interviews, ratings, and surveys to obtain insights about the users' overall experience with a particular service. A widely known method, Mean Opinion Score (MOS), is usually used for such subjective assessment. MOS is considered a ground truth for evaluating the QoE of the users. However, such methods work with focus groups, require conscious responses from users, and often do not provide sufficient insight into underlying perceptual and cognitive processes.

Users may also have difficulties reflecting their assessment given a particular scale that does not indicate well their perception. In addition, subjective methods are time-consuming, laborious, and are not applicable in real-time. To this end, objective methods have been proposed for assessing human factors of QoE. The goal of objective quality assessment is to automatically estimate the users' QoE. Instead of asking the users to provide input/rating, users' emotional state is measured continuously using data collected from the users.

Some of the terminologies used in this disclosure are explained below.

"BCI data"—Brain Computer Interface (BCI) data refers to user attributes which are usually collected using Electroencephalogram (EEG) headset/caps. This data may include implicit information from the users, such as their mental states (e.g., stress level), fatigue levels, mood, and emotional states. Using BCI data, the user's satisfaction level or experience can be obtained or at least deduced.

BCI data includes many features that are calculated using specific EEG frequency sub-bands, such as delta, theta, alpha, beta, or gamma sub-bands, as well as their interactions. Studies have shown that the alpha band (8-12 Hz) is correlated with the valence emotion and the beta frequency band (12-30 Hz) is associated with the arousal emotion. Hence, an Asymmetry Index (AI) has been developed to measure the valence emotion, and a Medial prefrontal cortex Beta Power (MBP) is used to measure the arousal emotion. Therefore, to characterize the BCI data, the following two features may be used: namely AI and MBP. However, other features can also be used to characterize the BCI data. Using these two features, a Valence-Arousal (VA) model can be derived.

FIG. 2 shows an exemplary two-dimensional VA emotion map included in R. Gupta, K. Laghari, H. Banville, and T. H. Falk, "Using affective braincomputer interfaces to characterize human influential factors for speech quality-of-experience perception modelling," Hum.-Centric Comput. Inf. Sci., vol. 6, no. 1, pp. 1-19, 2016. As illustrated in FIG. 2, with this VA model, various emotional constructs can be developed.

Valence (V) refers to the pleasantness (Positive Valence "PV") or unpleasantness (Negative Valence "NV") of an event.

Arousal (A) refers to the intensity of the event, ranging from very calming (Low Arousal "LA") to highly exciting (High Arousal "HA").

"IoT data"—IoT data may refer to the user attributes that can be collected through various sensors and actuators placed on the human body or in the vicinity of the human. For instance, camera sensors can detect facial expressions to know if a user is happy, distracted, etc. Another example is the wearable sensors which can be used to measure the blood pressure and blood glucose level to detect the stress level of the user.

"IoS data"—IoS data may refer to the user attributes that can be collected and/or transferred to the users through AR glasses, haptic sensors, VR systems, etc. The senses may include smell, sight, taste, touch, and sound senses.

SUMMARY

Accordingly, there is a need for a method that can satisfy the expectations (QoE) of users and different providers (e.g., applications, infrastructure) automatically. Hence, it is worth designing an end-to-end system that allows to automatically measure the QoE of the users considering factors from different layers such as user layer, application layer, and infrastructure layer. Such system can make appropriate management decisions at the infrastructure layer and/or the application layer such that the users' QoE are met. Such management decisions may optimize the performance of applications and infrastructures. For example, in the case of a mobile network, 5QI (in 5G) or QCI (in 4G) settings related to the flows of users may be manipulated to improve the QoE. A higher QoS setting is expected to boost the experienced QoE of users.

In related art, a QoE is determined based on Mean Opinion Score (MOS). For example, the QoE of a system or a service may be determined based on an average of scores that users of the system or the service assign to their opinions regarding the performance of the system or the service. However, the MOS presents a short-term QoE of a focus group only. In addition, the MOS is treated as a simple scalar value even though in many cases, there should be some correlation in judgments from different subjects.

Also, existing solutions focus on adapting BCI data to users' QoE. However, these solutions aim only at application optimization. The existing solutions are not for infrastructure or network adaptation.

Furthermore, there currently exists no end-to-end system that considers simultaneously the infrastructure performance, the application performance, and the users' satisfaction for QoE modelling.

Accordingly, in some embodiments, there is provided a model-based system that is configured (1) to automatically measure the QoE perceived by users and (2) to propose appropriate configuration changes at the infrastructure and application sides to satisfy the QoE of the users.

Additionally, and optionally, such configuration changes may be set to satisfy Key Performance Indicators (KPIs) of the infrastructure and/or applications.

In some embodiments, historical data (e.g., BCI, IoT, IoS, system/network parameters, application performance, etc.) may be collected from a monitored system and analyzed. From among the historical data, the most relevant features that have an impact on the QoE values and application performance are identified and selected. The extracted features may then be used to build a model that can determine the value of the QoE when using real-time data.

Given the obtained value of the QoE, there is also provided a mechanism to determine the required changes at the infrastructure and the application levels to ensure that the delivered service meets the users' expectations.

Additionally, and optionally, the required changes may be set to satisfy the KPI target of the application provider.

Accordingly, in one aspect, there is provided a method for improving user experience associated with an application supported by a system. The method comprises obtaining input data associated with a group of one or more features and determining a performance score associated with the obtained input data using a performance score generating model. The performance score indicates an estimated quality of user experience (QoE) of the application. The method further comprises determining whether to apply a configuration change based on the determined performance score. The configuration change is associated with the application and/or the system.

In another aspect there is provided a computer program comprising instructions which when executed by processing circuitry cause the processing circuitry to perform the method described above.

In another aspect, there is provided an apparatus for improving user experience associated with an application supported by a system. The apparatus is configured to obtain input data associated with a group of one or more features and determine a performance score associated with the obtained input data using a performance score generating model. The performance score indicates an estimated quality of user experience (QoE) of the application. The apparatus is further configured to determine whether to apply a configuration change based on the determined performance score. The configuration change is associated with the application and/or the system.

In another aspect, there is provided an apparatus comprising a memory and processing circuitry coupled to the memory. The apparatus is configured to perform the method described above.

Methods and/or systems according to embodiments of this disclosure provide at least one of the following advantages:

Providing an end-to-end solution where the goal is to satisfy the expectations of users (i.e., QoEs);

Allowing to consider data from different layers for QoE assessment, which makes the QoE values more representative, accurate, and timely. The followings are different types of data from different layers:

(1) User data: e.g., BCI data, IoT data, IoS data, and user contextual information (e.g., terminal capabilities), (2) System and/or network data: e.g., throughput, response time, bandwidth, and (3) Application data: KPIs of the application (e.g., application load time);

Allowing the QoE to be measured continuously and in an automated way (unlike subjective QoE assessments (e.g., MOS));

Providing a better service per user and hence better granularity; and

Improving the features offered by applications to satisfy the users' expectations based on their feedback.

BRIEF DESCRIPTION OF THE DRAWINGS

The accompanying drawings, which are incorporated herein and form part of the specification, illustrate various embodiments.

DETAILED DESCRIPTION

Figure 1:
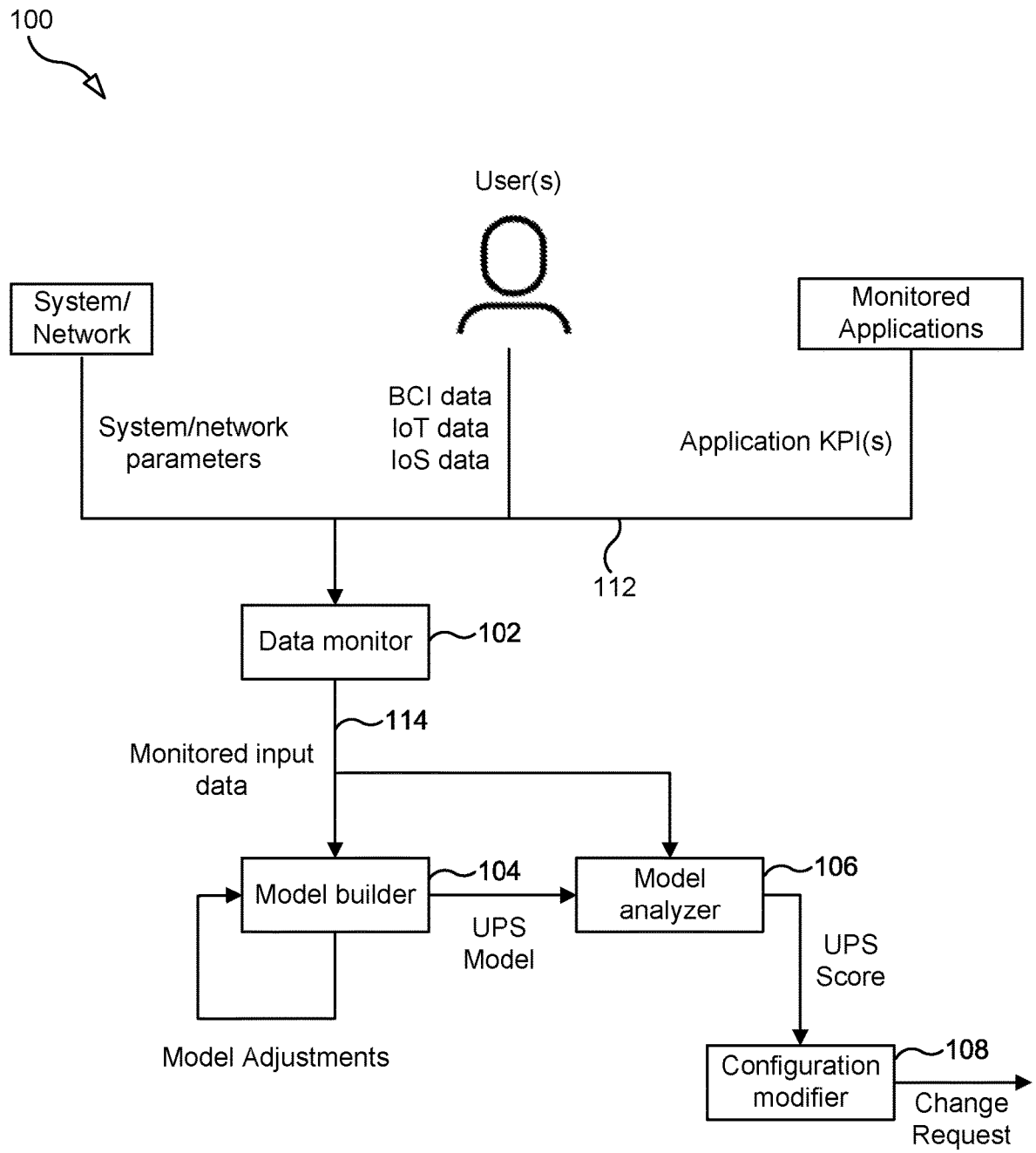
FIG. 1 shows a system according to some embodiments.
Figure 2:
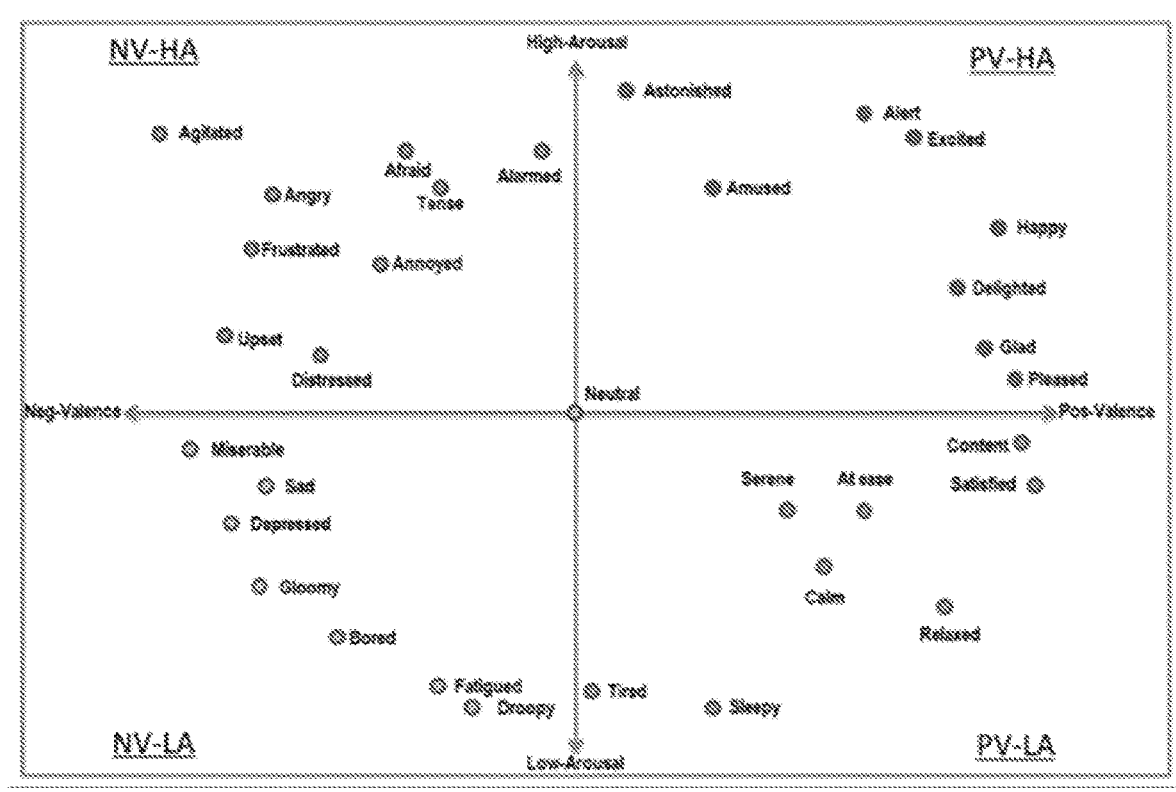
FIG. 2 shows an example of a two-dimensional VA emotion map.

FIG. 1 shows a system 100 according to some embodiments. The system 100 may include a data monitor 102, a model builder 104, a model analyzer 106, and a configuration modifier 108. The data monitor 102, the model builder 104, the model analyzer 106, and the configuration modifier 108 may be implemented in a single physical entity or may be distributed in a local network or in a cloud.

The data monitor 102 may be configured to receive and automatically analyze input data 112. The input data 112 may include data generated from user(s) (e.g., BCI data, IoT data, IoS data, etc.), data related to a monitored application (e.g., application KPIs), and/or data related to a monitored system/network (e.g., system parameter(s) and/or network parameter(s)). The monitored application may be HTTP sessions and audio/visual multimedia applications. The data generated from user(s) may individually or collectively represent the QoE of user(s) for using a particular application or a particular service. The data related to the monitored application and the data related to system/network (e.g., server CPU utilization, network throughput, etc.) may contribute to the QoE of the user(s) for using the application or the service. For example, a certain server CPU utilization may generally link to a particular level of QoE.

After receiving the input data 112, the data monitor 102 may further be configured to output monitored input data 114 to the model builder 104. After receiving the monitored input data 114, the model builder 104 may be configured to build a model using the monitored input data 114. More specifically, during the modelling, the model builder 104 may be configured to process the monitored input data 114 and extract the most relevant input data (a.k.a., features) that are needed to create the model. For example, if the input data 114 includes system parameter #1, system parameter #2, network parameter #1, network parameter #2, application KPI #1, and application KPI #2, the model builder 104 may be configured to select the system parameter #1, the network parameter #1, and the application KPI #1 from among the input data 114. In this example, the system parameter #1, the network parameter #1, and the application KPI #1 are features that are likely affect the QoE of the user(s) while the system parameter #2, the network parameter #2, and the application KPI #2 are features that are less likely affect the QoE of the user(s).

Conventionally, various sensor data (e.g., the BCI data, the IoT data, the IoS data, etc.) related to physiological states of user(s) must be collected and analyzed in order to measure the QoE of the user(s). However, in the embodiment shown in FIG. 1, the model created by the model builder 104 may be used to estimate the QoE of the user(s) for using a particular application or a service without collecting and analyzing the various sensor data. Based on the estimated QoE, appropriate configuration changes in the system and/or the network enabling running the application may be performed.

In this disclosure, the created model is referred as "User-Performance-System" model (herein after, "UPS model").

UPS (User-Performance-System) indicates the types of input data for the model:

U (User)—The input data of the UPS model may include a set of collected data from users (e.g., BCI data, IoT data, IoS data, etc.)

P (Performance parameters)—The input data of the UPS model may include Application(s)' KPIs (Key Performance Indicators). Examples of application(s)' KPIs include the starting or loading time of an application, a failure rate, a server usage, a lagging rate (especially for gaming applications), session length, revenue per user, etc.

S (System/network parameters)—The input data of the UPS model may include system and network parameter(s) such as throughput, response time, bandwidth, server utilization, etc.

As discussed above, the UPS model is built based on the received input data 114. In general, the more data are collected, more accurate UPS model may be created.

The created UPS model may be used to calculate a UPS score that indicates the user(s)' QoE. The UPS score may be used for (1) validating the obtained UPS model to verify how well the UPS model estimates the QoE of user with respect to the collected data and (2) determining model adjustments needed to obtain a better model representation (if needed). The input data of the model builder 104 is mainly the "monitored data" and the output is mainly a "UPS model" and "model adjustments" when needed. If the UPS model needs to be adjusted, the adjustments outputted by the model builder 104 may be fed back to the input of the model builder 104 such that the model builder 104 can adjust itself, thereby outputting more accurate UPS model.

Referring back to FIG. 1, the model analyzer 106 may obtain the UPS model from the model builder 104. After obtaining the UPS model, the model analyzer 106 may be configured to calculate the UPS score associated with real-time input data (e.g., the data that is monitored by the data monitor 102 in real-time) using the UPS model. The real-time input data is collected while a user is using a particular deployed application. After calculating the UPS score, the model analyzer 106 may be configured to provide the calculated UPS score to the configuration modifier 108. Here the UPS score may represent the QoE of the user(s) for using the deployed application.

The configuration modifier 108 may be configured to compare the obtained UPS score (which estimates the QoE of the user(s) with respect to using the deployed application on the current system and network) to a target UPS score and determine whether to apply configuration changes or not based on the comparison. The configuration modifier 108 is responsible for determining the needed configuration changes at both the infrastructure and application layers. The configuration changes are for improving the UPS score, thereby improving the QoE of the user(s).

In optional embodiments, the configuration modifier 108 may be further configured to obtain current KPIs of the deployed application and compare the current KPIs to target KPIs (i.e., desired KPIs), and determine whether to apply the configuration changes or not based on the comparison of the current KPIs to the target KPIs as well as the comparison of the current UPS score to the target UPS score. For example, even when the calculated UPS score is equal to better than the target UPS score, if the current KPIs are worse than the target KPIs, the configuration changes may be applied to improve the current KPIs. In another example, even when the calculated UPS score is less than the target UPS score, if the current KPIs are better than or equal to the target KPIs, the configuration changes may not need to be applied.

After receiving the UPS score outputted by the model analyzer 106, the configuration modifier 108 may determine whether to apply the configuration changes and as a result of determining that the configuration changes need to be applied, may output a change request—the request for configuration change(s) (e.g., "Infrastructure Changes Request", "Application Optimization Request," etc.).

Figure 3:
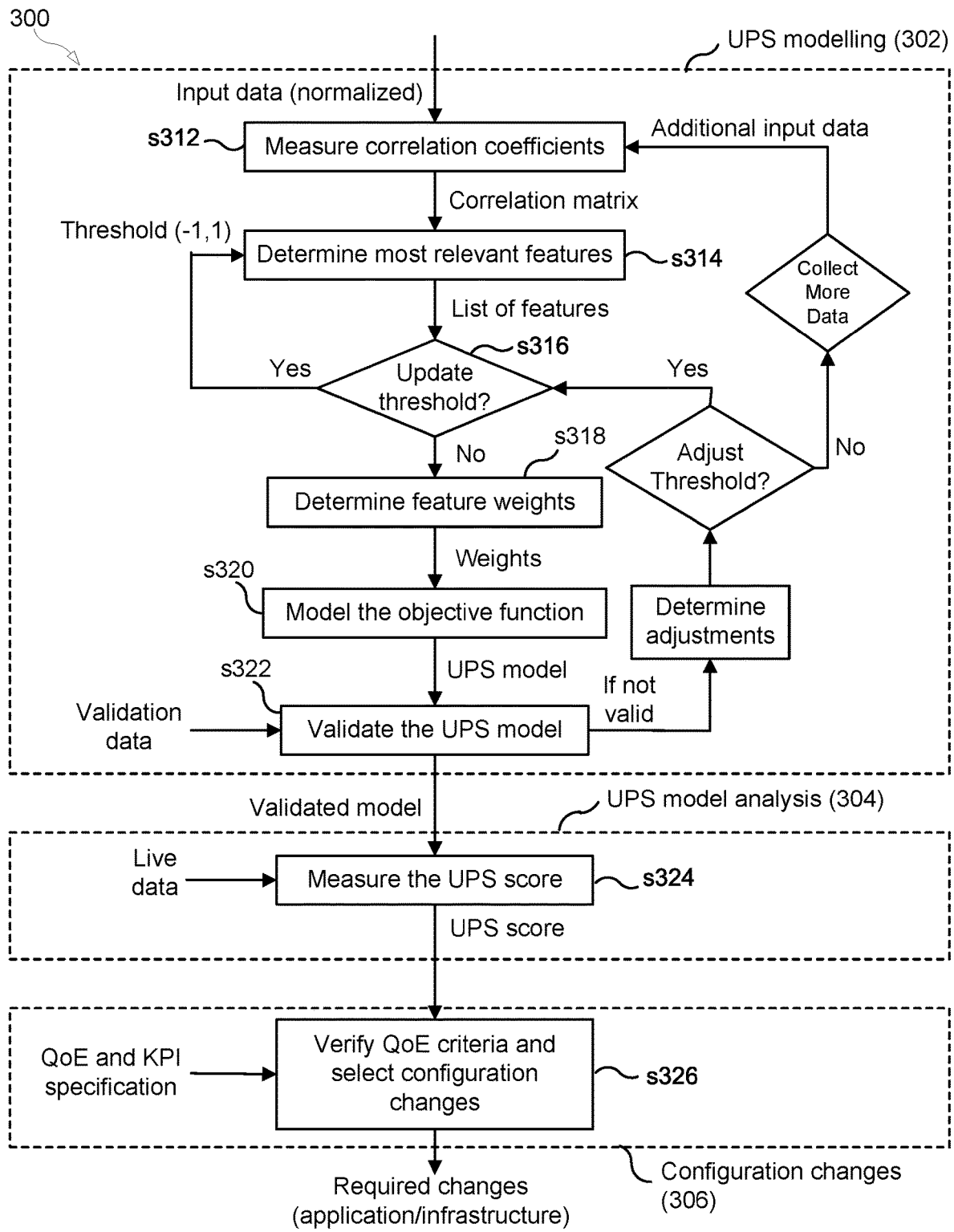
FIG. 3 shows a process according to some embodiments.

FIG. 3 shows a process 300 performed by the system 100 according to some embodiments. The process 300 may comprise a sub-process 302 for UPS modelling, a sub-process 304 for UPS model analysis, and a sub-process 306 for configuration changes.

The UPS modelling process 302 may begin with step s312. In step s312, input data (a.k.a., features) may be obtained and degrees of correlations between the features may be determined based on the obtained input data. More specifically, in step s312, degrees of correlations between features that represent the QoE of user(s) for using an application/service (herein after, "QoE features") and other features (herein after, "non-QoE features") may be determined. In some embodiments, the QoE features are any one or a combination of BCI data, IoT data, and IoS data. The non-QoE features may be network parameter(s), system parameter(s), and/or application KPI(s). In other embodiments, the QoE features are BCI data and the non-QoE features are any one or a combination of IoT data, IoS data, network parameter(s), system parameter(s), and/or application KPI(s). All of these features may represent data collected and aggregated from different layers (e.g., users, a system, a network, etc.).

As explained above, the QoE of user(s) for using a particular application and/or a service may be determined based on any one or a combination of the BCI data, the IoT data, or the IoS data. But obtaining the BCI data, the IoT data, or the IoS data (a.k.a., the QoE features) generally requires labor intensive processes-gathering one or more users, connecting sensors to the users, and measuring sensor data from the connected sensors. On the contrary, obtaining network/system parameter(s) and/or application KPI(s) (a.k.a., the non-QoE features) does not require such labor intensive processes. One aspect of some embodiments of this disclosure is estimating the QoE of user(s) for using a particular application/service based on the non-QoE features.

To measure the degrees of correlations between various features, a list of features that were monitored may be identified first, and then historical input data associated with the list of features may be collected from the data monitor 102. For example, if BCI data (which represents QoE of a user for using a deployed application) has the value "A" in case a particular system parameter having the value "B" is implemented, a correlation between the BCI data and the particular system parameter may be obtained based on the values "A" and "B." In some embodiments, the input data may be normalized before being used during the process 300. For example, the values "A" and "B" may be normalized before the correlation between the BCI data and the particular system parameter is obtained.

Various types of correlation coefficients (e.g., Spearman's correlation coefficients) may be used to express degrees of coefficients between various features. Via the step s312, a matrix of correlation coefficients (indicating the degrees of the correlations) may be obtained.

The correlation matrix may be used to indicate the degrees of correlations between various features. For example, a correlation value of +1 may indicate a positive correlation. The positive correlation may indicate that a value of a feature increases as a value of other feature increases. Similarly, a correlation value of −1 may indicate a negative correlation that may indicate that a value of a feature decreases as a value of other feature increases. A correlation value of 0 may indicate that there is no associated correlation between the features.

Figure 4A:
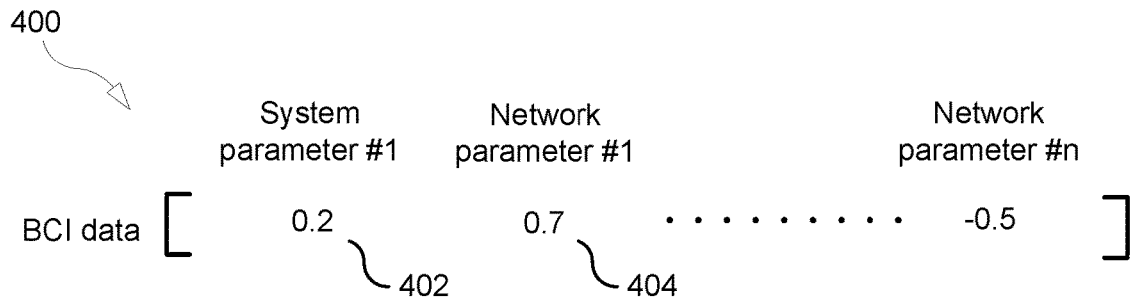
FIG. 4 shows an example of a correlation matrix according to some embodiments.

FIG. 4A shows an example 400 of the correlation matrix. Each of the elements of the matrix 400 indicates a correlation value between a QoE feature and non-QoE features. For example, if the BCI data alone is used to represent the QoE of user(s), then each element of the correlation matrix 400 may indicate the degree of a correlation between the BCI data and each of the non-QoE features (e.g., system parameter(s), network parameter(s), etc.). For example, the matrix element 402 in the correlation matrix 400 may indicate the degree of a correlation between the BCI data and the system parameter #1. Similarly, the matrix element 404 may indicate the degree of a correlation between the BCI data and the network parameter #1.

Figure 4B:
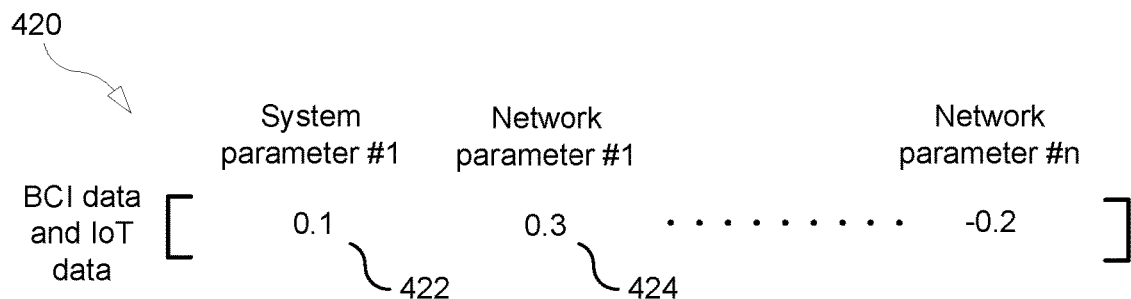

FIG. 4B shows another example 420 of the correlation matrix. In the correlation matrix 420, a combination of the BCI data and the IoT data represents the QoE of the user(s) for using a particular application/service. Thus, each element of the correlation matrix 420 indicates the degree of a correlation between a combined value of the BCI data and the IoT data and each of the non-QoE features. For example, the matrix element 422 in the correlation matrix 420 may indicate the degree of a correlation between the combined value of the BCI data and the IoT data and the system parameter #1. Similarly, the matrix element 424 may indicate the degree of a correlation between the combined value of the BCI data and the IoT data and the network parameter #1. There are many ways to calculate the combined value of the BCI data and the IoT data. For example, the combined value may be a weighted average of the BCI data and the IoT value.

Figure 4C:
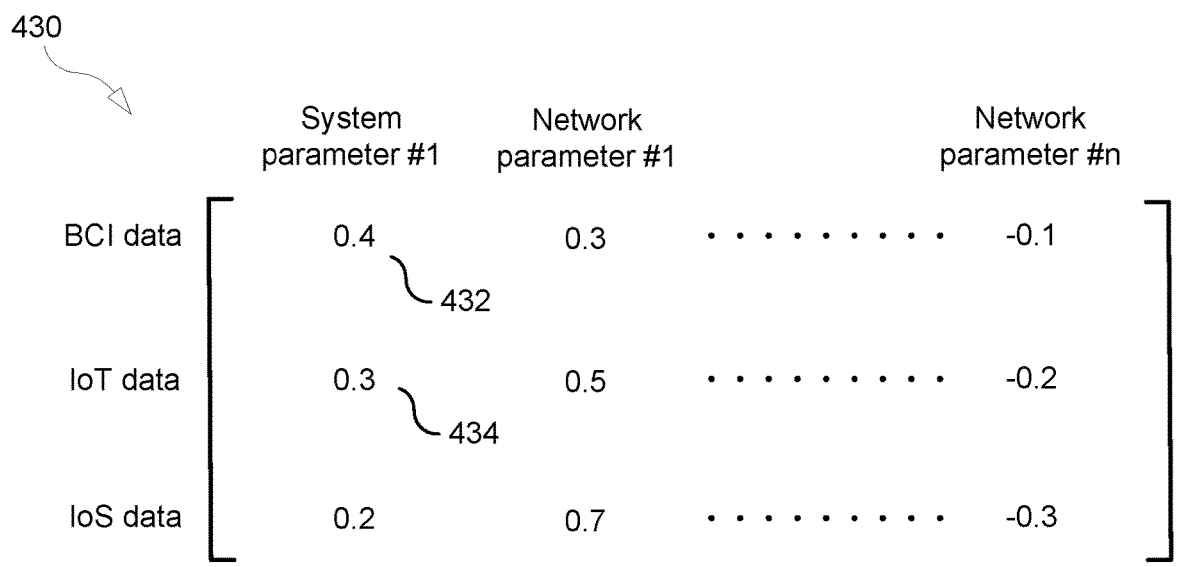

FIG. 4C shows another example 430 of the correlation matrix. Like the correlation matrix 420, in the correlation matrix 430, a combination of the BCI data and the IoT data represents the QoE of the user(s) for using a particular application/service. But instead of indicating the degree of a correlation between a combined value of QoE features (e.g., BCI data, IoT data, etc.), similar to the correlation matrix 410, each element of the correlation matrix 430 indicates the degree of a correlation between a single QoE feature and each of the non-QoE features. For example, the matrix element 432 in the correlation matrix 430 may indicate the degree of a correlation between the BCI data and the system parameter #1. Similarly, the matrix element 434 may indicate the degree of a correlation between the IoT data and the system parameter #1. In a summary, while the correlation matrix 400 shows a correlation between a single QoE feature and multiple non-QoE features, the correlation matrix 430 shows correlations between multiple QoE features and multiple non-QoE features.

The number of variables and/or the values of the matrix elements included the correlation matrices shown in FIGS. 4A-4C are provided for illustration purpose only and do not limit the embodiments of this disclosure in any way.

Referring back to FIG. 3, in step s314, the correlation matrix may be used to select the most relevant non-QoE features (e.g., system parameter(s), network parameter(s), and application KPI(s)) that are inter-correlated with the QoE features (e.g., the BCI data, the IoT data, and the IoS data). The most relevant non-QoE features are the features that are mostly likely affect the QoE of user(s) for using a particular service and/or a particular application. These most relevant features may be selected for building the UPS model in step s320. One reason for selecting the most relevant non-QoE features for building the UPS model (instead of using all non-QoE features) is because not all non-QoE features are significant enough to affect the QoE of the user(s).

The selection of the features may be based on an input threshold. The input threshold may be a pair of thresholds for selecting top positively correlated features and top negatively correlated features. For example, if the threshold pair has a value of (−0.7, 0.5), the feature(s) having a correlation between −1 and −0.7 and/or having a correlation between 0.5 and 1 are selected. The threshold pair may be provided by an application provider or may be set to be pre-defined values (e.g., (−0.5, 0.5)).

In some embodiments, after the features are selected, in optional step s316, a determination as to whether to update the input threshold may be made. For example, in case the number of selected features is less than the minimum number of required features that is (1) required for building the UPS model and (2) set and/or provided by the application provider, the input threshold may be adjusted (e.g., decreased) such that additional features can be selected.

In step s318, the impacts of the features (that are selected in step s314) on a target output are calculated. More specifically, in step s318, the degree of importance or the weights of the selected features with respect to the target output are calculated. The obtained weights of the selected features may be used in step s320.

In order to calculate the weights of the selected features, a Random Forest (RF) classifier may be used. As explained above, the selected non-QoE features are the non-QoE features that are mostly likely affect the target output (i.e., the QoE of a user). The RF classifier may measure the weights (importance) by assigning a score (a weight) to each of the selected features based on how they affect the target output.

Thus, in some embodiments, an RF classifier may be trained using (1) the values of the selected features as inputs and (2) the value of the target output (e.g., BCI data) as an output. The score assigned to each of the selected features may be obtained using values (e.g., "MeanDecreaseGini" in Python) obtained from the trained RF classifier.

Here, the target output may indicate the QoE of user(s) that is actually measured. For example, BCI data or any other type of user data such as IoT data or IoS data may be used as the target output. The BCI data or the other type of user data may be collected from the user using EEG sensors or any other types of physiological sensors that are configured to measure physiological characteristics of user which represent the QoE of the user(s).

In step s320, an UPS model is created as an objective function using the selected features. For example, the objective function may be modeled as a weighted sum of the selected features. The output of the objective function may be an estimated target output indicating the QoE of a user for using a deployed application. Here, the QoE of the user is associated with the input values of the selected features.

As described above, the features are obtained using the correlation matrix via the step s314 and the weights of the features are obtained in the step s318. The equation below is an example way of calculating a QoE score using application performance and system/network parameters.

$$\text{User } QoE\langle AI, MBP\rangle = \sum_{i:1\to N}[w_i * \{App.Perf_i\}] + \sum_{j:1\to M}[w_j * \{\text{system/network parameter}_j\}]$$

Here each of $w_i$ and $w_j$ is the weight of the selected feature, which is generated in the step s318 (e.g., by the RF classifier). N corresponds to the number of application performance indicators used for calculating the User QoE and M corresponds to the number of system/network parameters used for calculating the User QoE. Also App. $Perf_i$ is a value of an application performance indicator (e.g., key performance indicators) and system/network$_j$ is a value of a particular system/network parameter.

The UPS model is for modelling the relationship between the QoE of the user (i.e., the QoE features) and non QoE features (e.g., system parameters, network parameters, and application KPIs). Using the UPS model, a numerical value indicating the degree of QoE of the user(s) may be obtained without actually measuring the user's physiological characteristics that represent the QoE of the user.

For the BCI data, two features correlated with valence and arousal emotions, namely AI and MBP, may be used.

In step s322, the UPS model generated in step s320 may be validated. In order to validate the generated UPS model, validation data (which is collected using a monitoring system) may be used. The validation data may have the same format (e.g., the number of features, normalized values, etc.) as the data used for training the UPS model.

For the validation, a difference between (1) the output values of the UPS model when the validation data is inputted to the UPS model and (2) the real data values that measure the output values of the objective function may be calculated.

To calculate the difference, the Mean Square Deviation (MSD) that can measure the average of the squares of the errors may be used. More specifically, the difference may be calculated as the average squared difference between the estimated values and the actual values of the QoE in the UPS model. This validation step measures how good the UPS model is as to estimating a QoE associated with real data collected from the users.

If the difference indicates that the UPS model is not accurate, different adjustments may be made to get a better model representation. Here, an accurate UPS model is a model characterized with lower MSD values. In other words, the trained UPS model is able to measure the output UPS score, or the output value of the objective function, with accurate results or with lower values' deviations. Thus, in some embodiments, a threshold may be used to check whether the UPS model is accurate or not (e.g., the accuracy threshold of 98%, 95% . . . ).

If the UPS model meets the specified threshold, the UPS model becomes a validated UPS model to be used in the next steps.

On the other hand, if the UPS model's MSD does not satisfy the specified threshold, the UPS model should be adjusted in order to improve its performance.

Two exemplary methods to adjust the UPS model are as follows:

(1) Adjust the threshold to select the inter-correlated features in order to get more relevant features than the previous iteration; and/or (2) Simply collect more data in order to capture the relevant trend in the training data and build a better UPS model.

In some embodiments, the two methods can be used together. For example, the threshold value can be continuously adjusted until reaching the maximum number of attempts to improve the accuracy of the UPS model. Upon reaching the maximum number of attempts and if the accuracy is still low, more data can be collected to improve the accuracy.

Once the validated UPS model is obtained in step s322, in step s324, using the validated UPS model, a current UPS score which indicates estimated QoE of user(s) for using a deployed application may be calculated based on real-time (live) non-QoE data (e.g., network parameter(s), system parameter(s), application KPI(s)) that is collected and monitored.

For example, if the inputs of the validated UPS model are a current value of a particular system parameter and a current value of a particular network parameter, the UPS score outputted from the validated UPS model may indicate estimated QoE of user(s) for using a deployed application operated and/or enabled by a system/network that is adopted with the current value of the particular system parameter and the current value of the particular network parameter.

Using the validated UPS model, the QoE of user(s) may be obtained automatically without manually measuring the QoE of user(s) using various physiological sensors (i.e., without obtaining the QoE data).

In step s326, the current UPS score corresponding to the estimate QoE may be compared with a given (or required) QoE. For example, if the current UPS score is lower than the required QoE, configuration changes (e.g., infrastructure and application management changes) may be made to the system and/or the network. The required QoE for the deployed application may be provided by an application provider. In some embodiments, the required QoE may specify the number of users that should be in the BCI state within a particular range (e.g., more than 80% of users are happy, more than 90% of users are satisfied, etc.). In other embodiments, the required QoE is the minimum value or a particular range of the BCI state of a single user.

If the current UPS score does not meet the required QoE, in step s326, configuration changes (e.g., moving a computing component from a central cloud to an edge cloud or setting a higher bandwidth limitation) may be selected and applied to the system and/or the network.

In some embodiments, determining whether to select and/or apply the configuration changes may additionally depend on whether the current KPI specification satisfies the required KPI specification. For example, in some embodiments, in step s326, a particular current KPI value (e.g., a value of the current network delay) may be compared to the maximum permissible KPI value (e.g., the maximum allowed network delay). If the value of the current network delay is greater than the maximum allowed network delay, the configuration changes may be selected and applied even if the current UPS score satisfies the required UPS score. Alternatively, the configuration changes may be selected and applied only if the value of the current network delay is greater than the maximum allowed network delay and if the current UPS score does not meet the required UPS score.

The required KPI specification (e.g., system/network failure rate, network delay, or server overall utilization) may be obtained from the application provider. Here, the required KPI specification may be the KPIs that are expected by the application provider to be achieved by the deployed application.

Examples of KPIs include start or load time of an application, failure rate, server usage, lagging rate (for gaming applications), session length, revenue per user, etc.

In some embodiments, application performance (e.g., KPIs) may be calculated as shown in the equation below.

$$\text{Application Performance} = \sum_{a:1 \to K} \left[ w_a * \{\text{system/network}_a\} \right]$$

where system/network$_a$ is a value of a particular system/network parameter, $w_a$ is a weight associated with each system/network parameter, and K is the total number of system/network parameters.

As discussed above, the validated UPS model may be configured to capture the relationships between input data (i.e., non-QoE data) and a UPS score which may indicate the QoE of user(s) for using a particular application/service. In other words, using the UPS model, perceived user experience (i.e., the UPS score) associated with given input data may be predicted without actually measuring the perceived user experience (e.g., using an EEG sensor).

Figure 5:
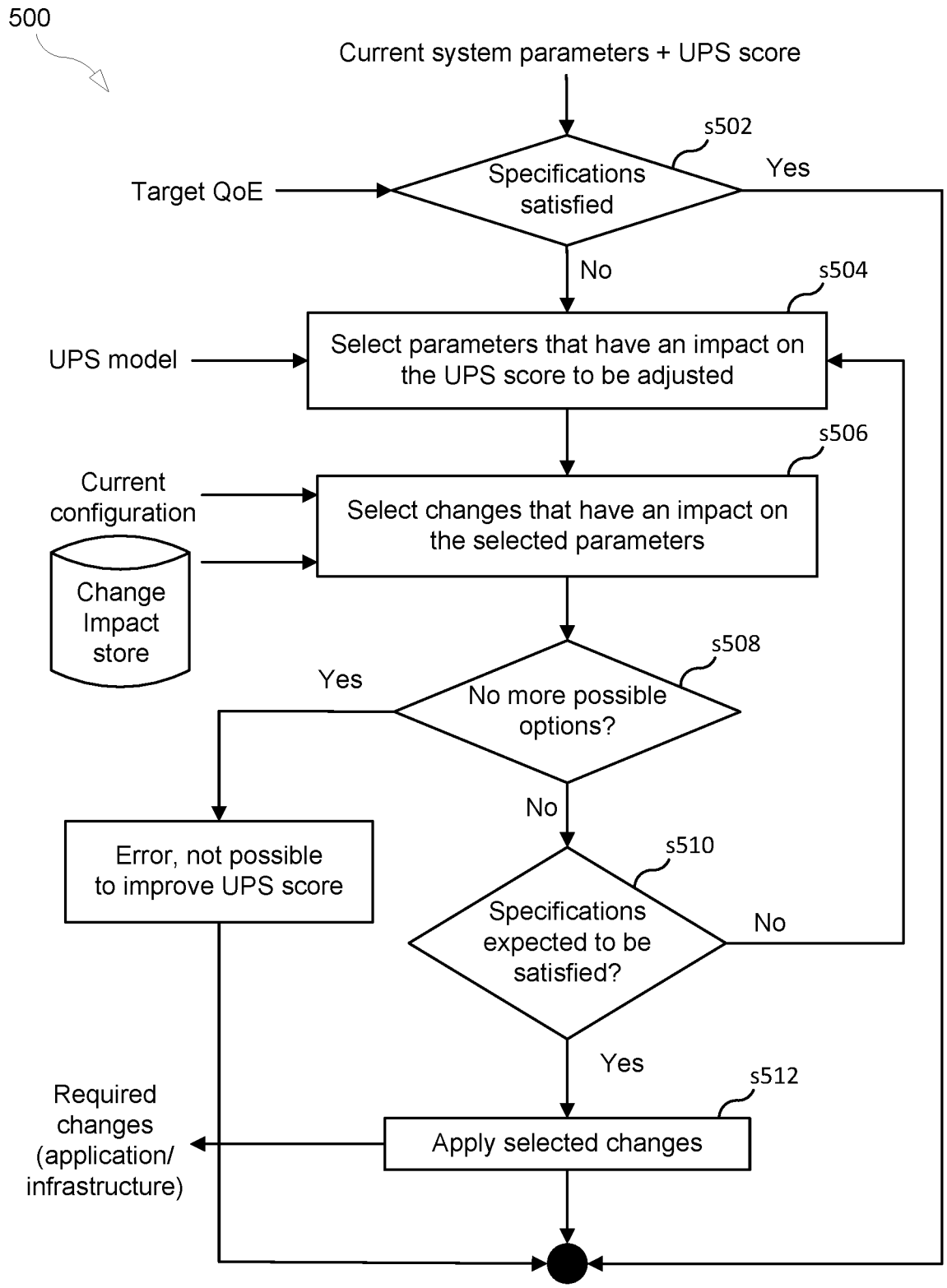
FIG. 5 shows a process according to some embodiments.

If it is determined that the estimated current UPS score does not meet the required UPS score (i.e., the required QoE), a process 500 shown in FIG. 5 may be used to find appropriate configuration changes that are likely impact the features, thereby impacting the UPS score.

In some embodiments, the UPS model may estimate a UPS score per a user and configuration changes may be triggered only when the UPS scores for a group of users do not meet the requirement. For example, the UPS scores for all users in the group may be combined and compared with a group threshold value, and the configuration changes are triggered only when the combined UPS score is less than the group threshold value. In another example, the UPS score of each user is compared with an individual threshold value and the configuration changes are triggered only when a particular number of users have the UPS scores that are less than the individual threshold value.

As discussed above, the current UPS score may be used to determine the types of configuration changes to be applied. For example, if the current UPS score (e.g., 20% user satisfaction) is lower than a minimum UPS score (e.g., 30% user satisfaction), the process 500 may be used to identify possible features (e.g., a network latency) that are likely to have an impact on the current UPS score. Then possible configuration changes (e.g., setting different 5G Quality of Service (Qos) Identifier (5QI) or QoS Class Identifier (QCI) values for certain flows, migrating a computing component from a central cloud to an edge cloud, or adding more CPU resources) may be made to change the value(s) of one or more features, thereby improving the UPS score.

In some embodiments, in addition to the UPS score, KPI parameters (a particular failure rate, a particular network delay, a particular server overall utilization, etc.) may be used to determine the types of configuration changes to be applied. For example, if a current value of a particular KPI parameter (e.g., the time it takes to launch an application) is higher than a permissible value of the particular KPI parameter (e.g., 1 second), from among the features that are likely to have an impact on the UPS score, possible features (e.g., a network latency) that are also likely to have an impact on the particular KPI parameter may be identified. Then configuration changes (e.g., setting different 5QI or QCI values for certain flows, migrating a computing component from a central cloud to an edge cloud, or adding more CPU resources) associated with the possible features may be made to change the value of the particular KPI parameter.

The impact of the configuration changes on the features may be learned by the system with a combined offline based and online based method, and may be stored in a storage entity. During the offline phase, the storage entity may be manually provided with information such as possible changes (e.g., workload migration, hardware allocation, bandwidth limitation, involved hardware acceleration) and their estimated effects on the features (e.g., system parameters, network parameters, physiological sensor data, and application performance data).

Alternatively, the storage entity may be provided with the information by using a reinforcement learning algorithm (e.g., Q-learning algorithm) in a simulated or a real environment. For example, possible states of the system and possible transitions between those states may be modeled, and then a Markov Decision Process (MPD) may be built using the model(s). The MPD model may be solved using a Q-learning algorithm to evaluate the effectiveness of the changes on the system and the effectiveness of the changes may be stored in the storage entity.

The online based process 500 for determining the type(s) of the configuration changes that need to be made is shown in FIG. 5. As shown in FIG. 5, the inputs of the process 500 are currently selected non-QoE features, and a UPS score associated with the currently selected non-QoE features.

In step s502, a target (expected) QoE value is obtained. For example, the target QoE value may correspond to the BCI state indicating that 90% of users are happy. In step s502, a determination is made as to whether the current UPS score does not satisfy the target QoE value. If the current UPS score does not satisfy the target QoE value, in step s504, one or more non-QoE features that are likely to impact the current UPS may be selected.

After the non-QoE features that are likely impacting the current UPS score are selected, a current configuration (e.g., system configuration(s), network configuration(s), or application configuration(s)) is loaded. Here, the current configuration describes application services and their deployment on the monitored system and the usage of services by the users (e.g., user A is using service B from an application deployed on server C). Using the information stored in the storage entity as discussed above, in step s506, one or more configuration changes that are likely to impact the selected features may be selected. In some embodiments, the storage entity may also store expected numerical value changes of the features with respect to the configuration changes. Since the storage entity also records the expected numerical changes in the parameters, it is possible to determine if the specifications are expected to be satisfied using the given change.

In step s508, it is checked as to whether there are any available configuration changes that are likely to improve the current UPS score such the current UPS score satisfies the target UPS score. If there are no other available configuration changes that can be made to improve the current UPS score, an error is reported.

On the other hand, if additional configuration changes for improving the current UPS score are available, the process may proceed to step s510.

In step s510, it is determined as to whether the configuration changes will improve the current UPS score. If so, the configuration changes are applied. If not, the process may return to step s504.

Even though FIG. 5 shows that step s508 is performed prior to performing step s510, in other embodiments, step s508 may be performed after performing step s510. In such embodiment, step s508 may be performed after performing step s510 but before returning to performing step s504. More specifically, in response to determining in step s510 that the configuration changes will not improve the current UPS score, step s508 may be performed to check if there are any other available configuration changes that are likely to improve the current UPS score. If there are, the process may proceed to step s504. If there is no other configuration changes that are likely to improve the current UPS score, an error may be reported.

After determining that the configuration changes will likely improve the current UPS score, in step s512, the configuration changes are applied.

Figure 6:
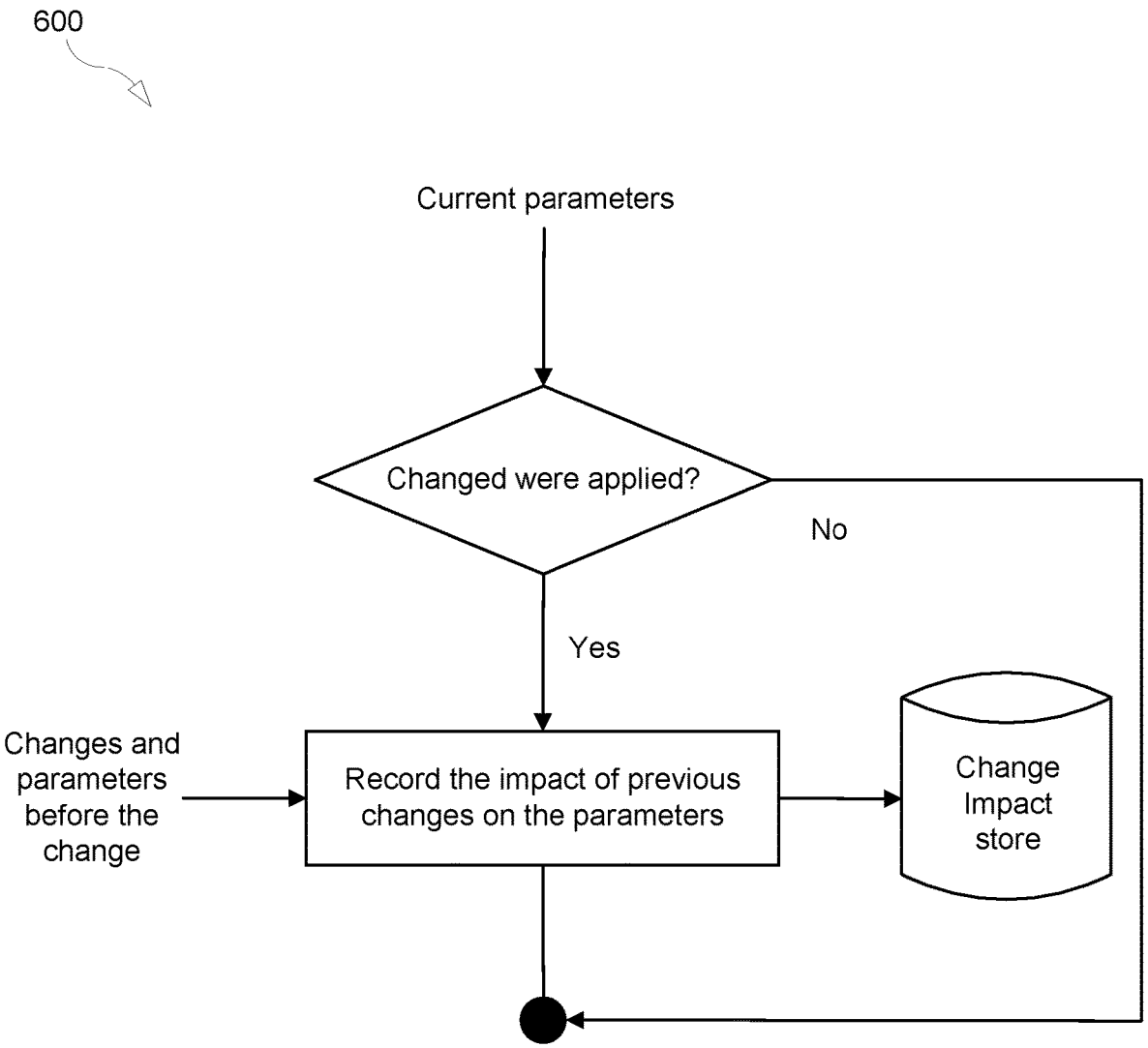
FIG. 6 shows a process according to some embodiments.

In some embodiments, the information stored in the storage entity—how one or more features will be affected by one or more configuration changes—may be updated. FIG. 6 shows a process 600 for updating the information about the configuration changes and their impact on the features. As shown in FIG. 6, when the configuration changes are implemented in the system and/or the network, the features are likely to be changed. The storage entity may be updated using the changes of the features and the configuration changes associated with the changes of the features. As the information stored in the storage entity is updated, more accurate configuration changes that need to be made can be obtained, and thus the system and/or the network can be further improved.

Figure 7:
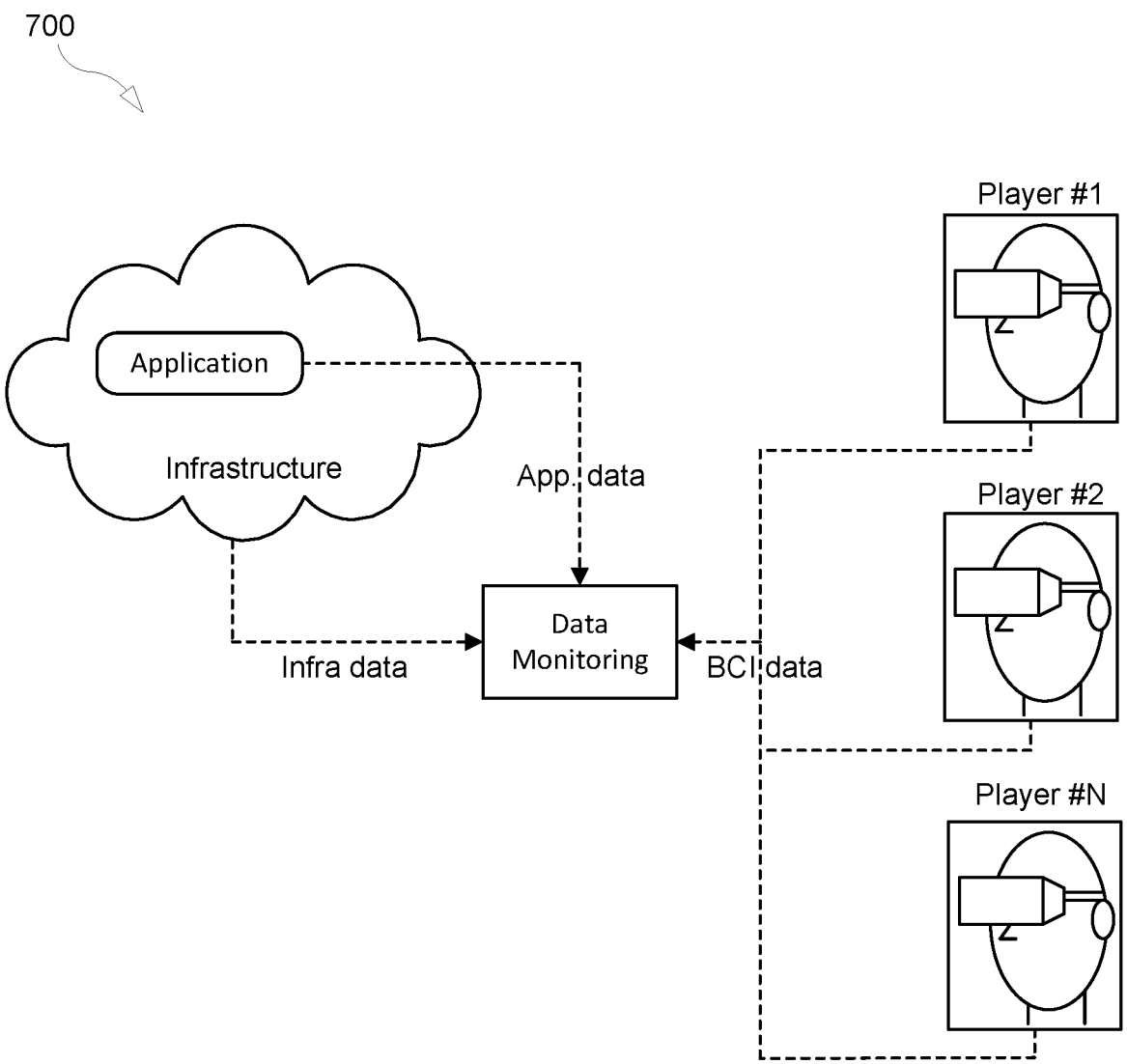
FIG. 7 illustrates a use-case example according to some embodiments.

FIG. 7 illustrates a use case example where methods and/or systems according to some embodiments of this disclosure can be implemented and used. In the scenario 700 shown in FIG. 7, multiple players are playing a virtual reality (VR) game. Each player may wear a VR headset which may be used for collecting BCI data (e.g., EEG data). In this exemplary scenario, three types of data are collected: BCI data of users (e.g., collected by the VR headsets), application data (KPIs of application such as session length, revenue per user, etc.), and infrastructure data (resource usages, bandwidth of links, response latency, etc.).

These data may be provided to the model builder 104 shown in FIG. 1. From among the obtained data (features), the model builder 104 may select non-QoE features (e.g., the application data and/or the infrastructure data)) that are most relevant to QoE of the user(s) (measured by the QoE feature—i.e., the BCI data in this example) in playing the VR game. The selected non-QoE features may be used to build a UPS model.

The model analyzer 104 may be used to calculate a current UPS score for live non-QoE data (e.g., the non-BCI data) collected from different users. The calculated UPS score may be validated with a required (given) QoE (e.g., 60% of users should be happy, 80% of users should be satisfied, etc.).

As discussed above, in some embodiments, in addition to validating the current UPS score, the current KPI specification may be validated using a required KPI specification (e.g., average network delay should be less than 20 ms).

More specifically, even in the case where the current UPS score satisfies the required QoE, if the current KPI specification does not satisfy required KPI specification, the configuration modifier 108 may identify and apply appropriate configuration changes to the system and/or the network, thereby resulting in better KPI specification.

For example, even when the current UPS score indicates that user(s) is satisfied, if the current KPI specification indicates that network latency is too long, the configuration change of allocating 30% more bandwidth for the game application may be applied to improve the current KPI specification.

As discussed above, the methods according to the embodiments of this disclosure may be implemented and deployed within any distributed or centralized infrastructure cloud system. For example, the methods may be implemented in one module or distributed among multiple modules that are connected.

Figure 8:
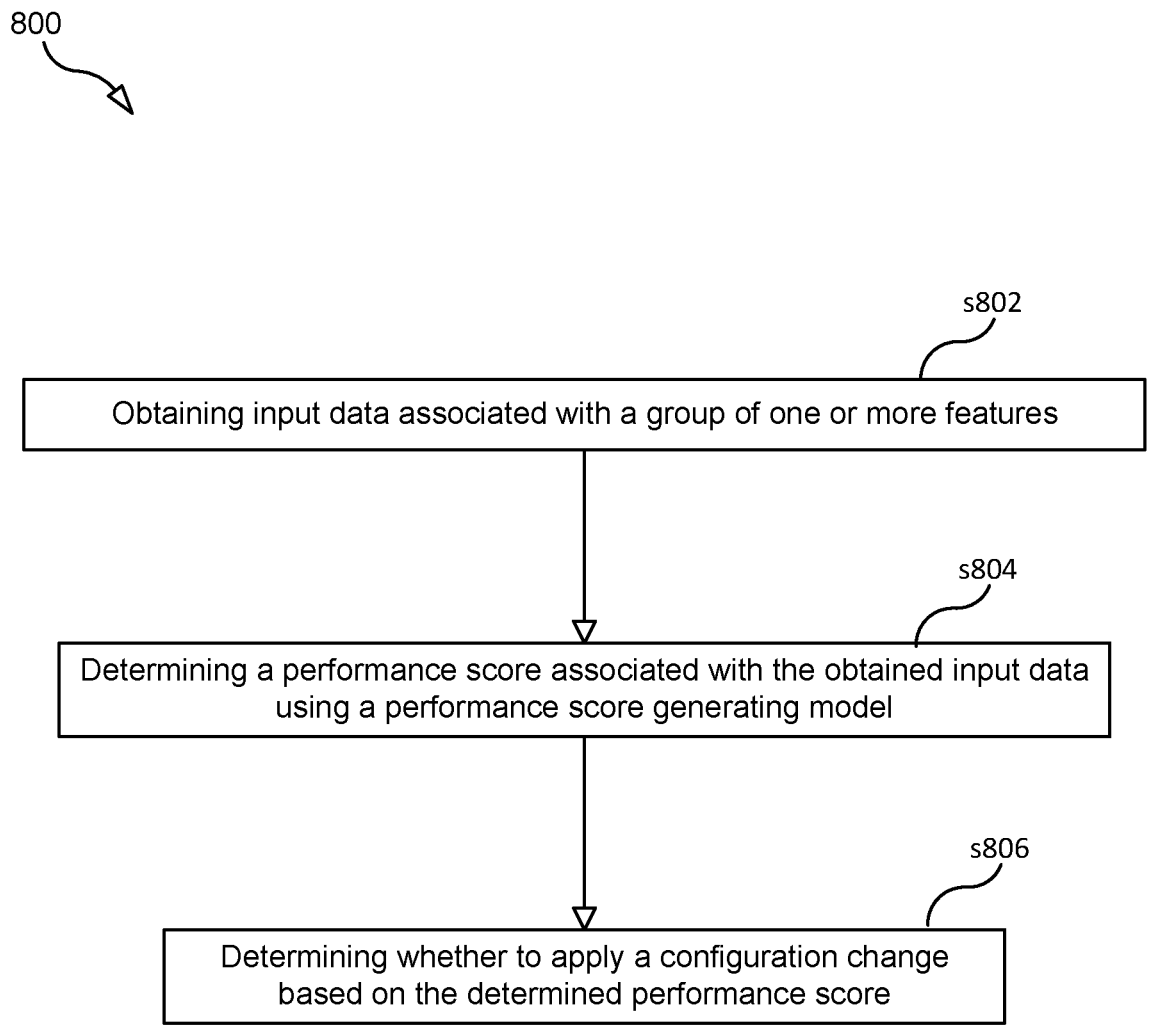
FIG. 8 shows a process according to some embodiments.

FIG. 8 shows a process 800 for improving user experience associated with an application supported by a system, according to some embodiments. The process 800 may begin with step s802.

Step s802 comprises obtaining input data associated with a group of one or more features.

Step s804 comprises determining a performance score associated with the obtained input data using a performance score generating model. The performance score indicates an estimated quality of user experience (QoE) of the application.

Step s806 comprises determining whether to apply a configuration change based on the determined performance score. The configuration change is associated with the application and/or the system.

In some embodiments, the method further comprises obtaining a target QoE score, wherein determining whether to apply the configuration change comprises comparing the determined performance score with the obtained target QoE score.

In some embodiments, the method further comprises determining that the determined performance score is less than the received target QoE score; and as a result of determining that the determined performance score is less than the received target QoE score, identifying at least one feature included in the group of one or more features that is mostly likely to improve the determined performance score.

In some embodiments, the method further comprises based on the identified at least one feature, identifying one or more configuration changes associated with the application and/or the system.

In some embodiments, the method further comprises obtaining updated input data associated with the group of one or more features, wherein the updated input data is obtained using the selected one or more configuration changes to the application and/or the system, determining an updated performance score associated with the updated input data using the performance score generating model, and determining whether to apply another configuration change based on the determined updated performance score.

In some embodiments, identifying said one or more configuration changes based on the identified at least one feature comprises providing the identified at least one feature to a database or a model, and obtaining from the database or the model said identified one or more configuration changes. A mapping between (i) said identified one or more configuration changes and (ii) an estimated change on a value of the identified at least one feature or an estimated value of the identified at least one feature is provided by the database or the model.

In some embodiments, the obtained input data includes a first input value associated with a first feature and a second input value associated with a second feature and the performance score associated with the obtained input data is calculated based at least on a weighted first input value and a weighted second input value. Also, in some embodiments, the weighted first input value is calculated based on a first weight and the first input value, and the weighted second input value is calculated based on a second weight and the second input value.

In some embodiments, the method further comprises obtaining a performance indicator indicating performance related to running the application; and comparing the obtained performance indicator to a target performance indicator indicating required performance related to running the application. Whether to apply the configuration change is further based on the comparison of the obtained performance indicator to the target performance indicator.

In some embodiments, the method further comprises obtaining a measured QoE score that is measured using one or more physiological sensors, obtaining historical input data associated with the group of one or more features, determining the first weight based on a correlation between the measured QoE and the historical input data associated with the first feature, and determining the second weight based on a correlation between the measured QoE and the historical input data associated with the second feature.

Figure 9:
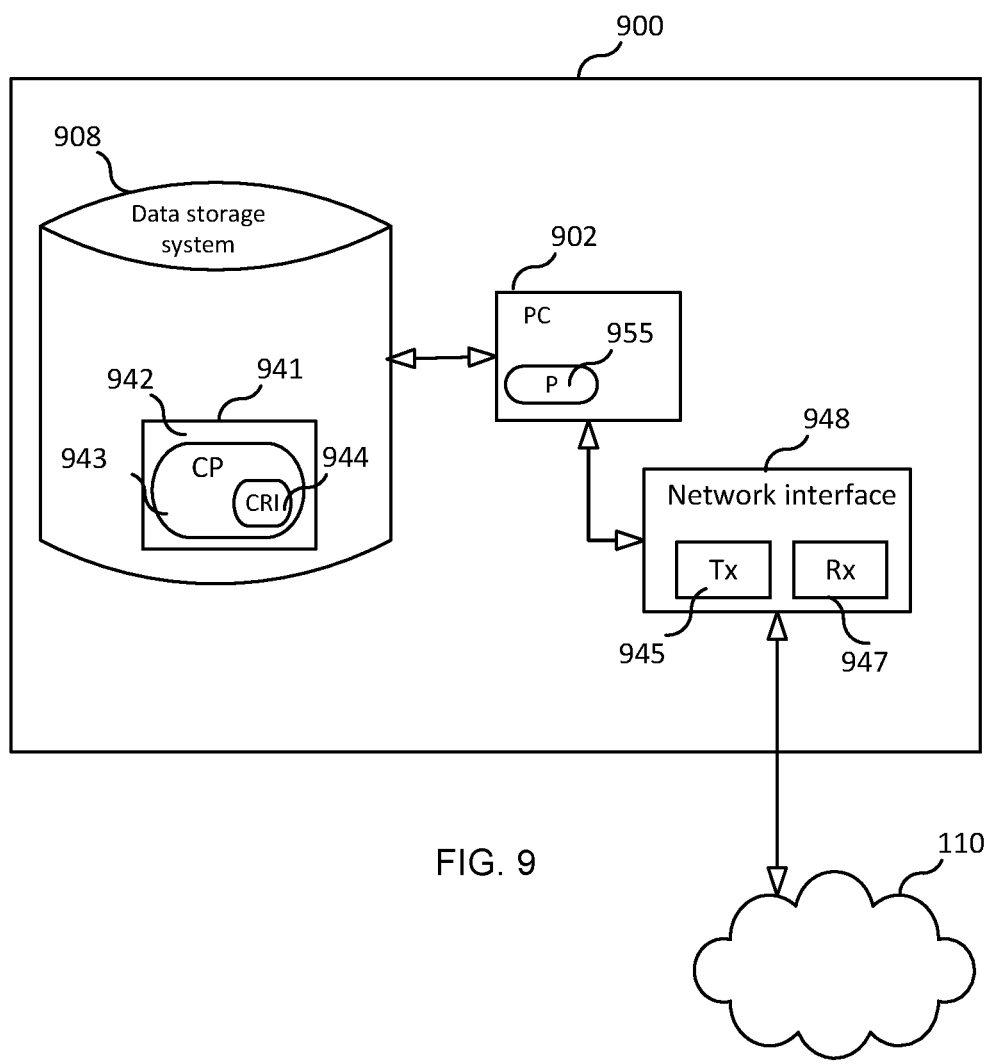
FIG. 9 shows an apparatus according to some embodiments

FIG. 9 is a block diagram of an apparatus 900, according to some embodiments, for performing the methods described above. As shown in FIG. 9, apparatus 900 may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 900 may be a distributed computing apparatus); a network interface 948 optionally comprising a transmitter (Tx) 945 and a receiver (Rx) 947 for enabling apparatus 900 to transmit data to and receive data from other nodes connected to a network 110 (e.g., an Internet Protocol (IP) network) to which network interface 948 is connected (directly or indirectly) (e.g., network interface 948 may be wirelessly connected to the network 110, in which case network interface 948 is connected to an antenna arrangement); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes apparatus 900 to perform steps described herein (e.g., steps described herein with reference to the flow charts). In other embodiments, apparatus 900 may be configured to perform steps described herein without the need for code. That is, for example, PC 902 may consist merely of one or more ASICs. Hence, the features of the embodiments described herein may be implemented in hardware and/or software.

| Abbreviations | |
|---|---|
| Abbreviation | Explanation |
| BCI | Brain Computer Interface |
| RF | Random Forest |
| MSD | Mean Square Deviation |
| QoE | Quality of Experience |
| QoS | Quality of Service |
| EEG | Electroencephalogram |
| MOG | Mean Opinion Score |
| 5QI | 5G QoS Identifier |
| QCI | QoS Class Identifier |
| AI | Asymmetry Index |
| MBP | Medial prefrontal cortex Beta Power |
| VA | Valance-Arousal |

-continued

| Abbreviation | Explanation |
|---|---|
| IoT | Internet of Things |
| IoS | Internet of Senses |
| AR | Augmented Reality |
| VR | Virtual Reality |
| KPI | Key Performance Indicator |
| MDP | Markov Decision Process |

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes and message flows described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for improving user experience associated with an application supported by a system, the method comprising:
    obtaining a measured QoE score that is measured using one or more physiological sensors;
    obtaining historical input data associated with a group of one or more features;
    determining a first weight based on a correlation between the measured QoE and the historical input data associated with a first feature;
    determining a second weight based on a correlation between the measured QoE and the historical input data associated with a second feature;
    obtaining input data associated with the group of one or more features, the obtained input data including a first input value associated with the first feature and a second input value associated with the second feature, the input data being calculated based at least on a weighted first input value and a weighted second input value, the weighted first input value being calculated based on the first weight and the first input value, the weighted second input value being calculated based on the second weight and the second input value;
    obtaining a target Quality of Experience, QoE, score;
    determining a performance score associated with the obtained input data using a performance score generating model, the performance score indicating an estimated QoE of the application; and
    determining whether to apply a configuration change based on the determined performance score, the configuration change being associated with the application and/or the system, determining whether to apply the configuration change comprising comparing the determined performance score with the obtained target QoE score;
    determining that the determined performance score is less than the target QoE score; and
    as a result of determining that the determined performance score is less than the target QoE score, identifying at least one feature included in the group of one or more features that is most likely to improve the determined performance score.

2. The method of claim 1, the method further comprising:
    based on the identified at least one feature, identifying one or more configuration changes associated with the application and/or the system; and
    causing to apply said identified one or more configuration changes.

3. The method of claim 2, the method further comprising:
    obtaining updated input data associated with the group of one or more features, wherein the updated input data is obtained using the selected one or more configuration changes to the application and/or the system;
    determining an updated performance score associated with the updated input data using the performance score generating model; and
    determining whether to apply another configuration change based on the determined updated performance score.

4. The method of claim 2, wherein:
    identifying said one or more configuration changes based on the identified at least one feature comprises:
        providing the identified at least one feature to a database or a model, and
        obtaining from the database or the model said identified one or more configuration changes, and
    a mapping between (i) said identified one or more configuration changes and (ii) an estimated change on a value of the identified at least one feature or an estimated value of the identified at least one feature is provided by the database or the model.

5. The method of claim 1, the method further comprising:
    obtaining a performance indicator indicating performance related to running the application; and
    comparing the obtained performance indicator to a target performance indicator indicating required performance related to running the application, wherein
    whether to apply the configuration change is further based on the comparison of the obtained performance indicator to the target performance indicator.

6. The method of claim 1, wherein the group of one or more features includes any one or a combination of a resource usage, a bandwidth of a link, a response latency, a server utilization rate, a system throughput, and a network throughput.

7. The method of claim 1, wherein said one or more physiological sensors are any one or a combination of an electroencephalogram, EEG, sensor, a sensor capable of measuring blood pressure, and a sensor capable of measure blood glucose level.

8. An apparatus for improving user experience associated with an application supported by a system, the apparatus comprising:
    a memory; and
    processing circuitry coupled to the memory, wherein the apparatus is configured to:
        obtain a measured QoE score that is measured using one or more physiological sensors;
        obtain historical input data associated with a group of one or more features;
        determine a first weight based on a correlation between the measured QoE and the historical input data associated with a first feature;

determine a second weight based on a correlation between the measured QoE and the historical input data associated with a second feature;

obtain input data associated with the group of one or more features, the obtained input data including a first input value associated with the first feature and a second input value associated with the second feature, the input data being calculated based at least on a weighted first input value and a weighted second input value, the weighted first input value being calculated based on the first weight and the first input value, the weighted second input value being calculated based on the second weight and the second input value;

obtain a target Quality of Experience, QoE, score;

determine a performance score associated with the obtained input data using a performance score generating model, the performance score indicating an estimated QoE of the application; and determine whether to apply a configuration change based on the determined performance score, the configuration change being associated with the application and/or the system, determining whether to apply the configuration change comprising comparing the determined performance score with the obtained target QoE score;

determine that the determined performance score is less than the target QoE score; and as a result of determining that the determined performance score is less than the target QoE score, identify at least one feature included in the group of one or more features that is most likely to improve the determined performance score.

9. The apparatus of claim 8, wherein the apparatus is configured to:
based on the identified at least one feature, identifying one or more configuration changes associated with the application and/or the system; and
causing to apply said identified one or more configuration changes.

10. The apparatus of claim 9, wherein the apparatus is configured to:
obtaining updated input data associated with the group of one or more features, wherein the updated input data is obtained using the selected one or more configuration changes to the application and/or the system;
determining an updated performance score associated with the updated input data using the performance score generating model; and
determining whether to apply another configuration change based on the determined updated performance score.

11. The apparatus of claim 9, wherein:
identifying said one or more configuration changes based on the identified at least one feature comprises:
providing the identified at least one feature to a database or a model, and
obtaining from the database or the model said identified one or more configuration changes, and
a mapping between (i) said identified one or more configuration changes and (ii) an estimated change on a value of the identified at least one feature or an estimated value of the identified at least one feature is provided by the database or the model.

12. The apparatus of claim 8, wherein the apparatus is configured to:

obtaining a performance indicator indicating performance related to running the application; and
comparing the obtained performance indicator to a target performance indicator indicating required performance related to running the application, wherein
whether to apply the configuration change is further based on the comparison of the obtained performance indicator to the target performance indicator.

13. The apparatus of claim 8, wherein the group of one or more features includes any one or a combination of a resource usage, a bandwidth of a link, a response latency, a server utilization rate, a system throughput, and a network throughput.

14. The apparatus of claim 8, wherein said one or more physiological sensors are any one or a combination of an electroencephalogram, EEG, sensor, a sensor capable of measuring blood pressure, and a sensor capable of measure blood glucose level.

15. A computer program product comprising a non-transitory computer readable storage medium storing a computer program comprising instructions which when executed by processing circuitry of an apparatus causes the apparatus to perform a method for improving user experience associated with an application supported by a system, the method comprising:

obtaining a measured QoE score that is measured using one or more physiological sensors;

obtaining historical input data associated with a group of one or more features;

determining a first weight based on a correlation between the measured QoE and the historical input data associated with a first feature;

determining a second weight based on a correlation between the measured QoE and the historical input data associated with a second feature;

obtaining input data associated with the group of one or more features, the obtained input data including a first input value associated with the first feature and a second input value associated with the second feature, the input data being calculated based at least on a weighted first input value and a weighted second input value, the weighted first input value being calculated based on the first weight and the first input value, the weighted second input value being calculated based on the second weight and the second input value;

obtaining a target Quality of Experience, QoE, score;

determining a performance score associated with the obtained input data using a performance score generating model, the performance score indicating an estimated QoE of the application; and determining whether to apply a configuration change based on the determined performance score, the configuration change being associated with the application and/or the system, determining whether to apply the configuration change comprising comparing the determined performance score with the obtained target QoE score;

determining that the determined performance score is less than the target QoE score; and as a result of determining that the determined performance score is less than the target QoE score, identifying at least one feature included in the group of one or more features that is most likely to improve the determined performance score.

* * * * *